United States Patent [19]

Sera et al.

[11] 4,244,671
[45] Jan. 13, 1981

[54] MECHANISM FOR DESTACKING AND DISCHARGING NESTED ARTICLES

[75] Inventors: Franklin J. Sera, San Jose, Calif.; William V. Gonda, Homer City; Robert E. McDowell, Indiana, both of Pa.

[73] Assignee: FMC Corporation, San Jose, Calif.

[21] Appl. No.: 922,130

[22] Filed: Jul. 5, 1978

[51] Int. Cl.³ .............................................. B65G 59/10
[52] U.S. Cl. .................................... 414/128; 221/223; 414/131
[58] Field of Search ............... 414/112, 115, 125, 126, 414/128, 129, 131; 221/11, 213, 214, 215, 221, 223, 251, 272

[56] References Cited

U.S. PATENT DOCUMENTS

| 1,660,247 | 2/1928 | Wooten et al. | 221/221 |
|---|---|---|---|
| 3,243,076 | 3/1966 | Strombeck | 221/251 X |
| 3,283,955 | 11/1966 | Crabtree | 221/221 X |
| 3,297,201 | 1/1967 | Burt | 221/221 |
| 3,406,495 | 10/1968 | Beninger et al. | 414/131 X |
| 3,472,403 | 10/1969 | Mueller et al. | 221/221 X |
| 3,477,592 | 11/1969 | Kuhlman | 221/221 X |
| 3,601,282 | 8/1971 | Vogel | 221/251 |
| 3,795,344 | 3/1974 | Falk et al. | 221/221 X |
| 3,795,346 | 3/1974 | Roberts et al. | 221/223 |
| 4,019,452 | 4/1977 | Rouse | 414/126 X |

*Primary Examiner*—L. J. Paperner
*Attorney, Agent, or Firm*—Jack W. Edwards; Robert S. Kelly

[57] ABSTRACT

There is disclosed a multi-lane destacking machine in which stacks of nested articles in each lane are fed, one at a time, through an opening to drop to a shuttle platform. A clamp mechanism grips a stack on the shuttle platform, and the platform is retracted. A stripper mechanism, which has sharp, pointed edges on stripper arms to penetrate the interstice between the bottom article and the article nested therewith, advances to dislodge the bottom article of the stack onto a surface in front of the retracted shuttle platform. When the shuttle platform is advanced to again support the stack upon release of the clamp mechanism, the previously dislodged article is moved from under the stripper mechanism into a discharge lane by the shuttle platform. When the stripper mechanism is retracted, the stripper arms, which are normally biased toward each other, engage a stationary stop to spread apart.

7 Claims, 20 Drawing Figures

FIG_4

FIG_6

FIG_5

FIG_10

MECHANISM FOR DESTACKING AND DISCHARGING NESTED ARTICLES

BACKGROUND OF THE INVENTION

1. Field of the Invention

The present invention relates to machines for destacking nested articles.

2. Description of the Prior Art

It is common for a manufacturer to nest articles in stacks for convenience of handling and shipping. It is therefore necessary for the user of the articles to remove them, one at a time, from the stack. When these articles are to be used as containers for the products of a food processing plant, or as one part of an assembly produced in a manufacturing plant, it is usual to employ destacking machinery to separate the articles, one at a time, from the stack in which they are shipped.

One type of destacking machine is shown in the United States patent to Kuhlman, U.S. Pat. No. 3,477,592. In this patent, there is shown an indexing member which advances to support a stack for clamping, and means to clamp the stack above the bottom article. A stripper mechanism is provided below the clamp means to dislodge the bottom article from the stack after the indexing member is retracted.

Ordinarily, the bottom article can be dislodged without difficulty. However, if the bottom article clings tightly to the article nested therewith, or if the bottom article has a narrow, beadless periphery, it may be difficult for the stripper mechanism to achieve a satisfactory engagement with the bottom article, or maintain such engagement until the bottom article is dislodged.

It is usually important that dislodged articles assume a predetermined orientation for a quick and orderly discharge from the destacking mechanism. Articles that are allowed to drop at random from the destacking mechanism must be reoriented before their ultimate use.

SUMMARY OF THE INVENTION

With the mechanism of the present invention, positive engagement of the stripper mechanism with the bottom article assures a reliable release of the article from the stack. At the same time, mechanism is provided for a quick discharge of the released article, in a predetermined orientation, for convenient subsequent use.

In one form of the present invention, stripper mechanism of a destacking machine which has a frame and which has a base shiftable with respect to said frame, is adapted to dislodge the end article in a nested stack held by a clamp mechanism engaging said stack beyond said end article. The stripper mechanism has an actuating member and has article-engaging members to engage the end article for dislodgment thereof on operation of the actuating member. The actuating member is mounted on the base, and the base is shiftable toward and away from the stack. The article-engaging members are pivotally mounted on the actuating member in spaced apart relation to straddle the stack. Means is provided to bias the article-engaging members together to engage the stack when the base is advanced toward the stack, and stop means mounted on the frame is provided to engage article-engaging members on retraction of the base from the stack to force the article-engaging members apart.

In another form of the invention, the stripper mechanism for dislodging the end article in a nested stack (which stack is held by clamp mechanism engaging said stack beyond the end article) has members to engage the article for dislodgment thereof on relative movement between said clamp means and said members. The article-engaging members have sharp edges to penetrate the interstice between the end article and the next-to-the-end article for a positive engagement of said members with the end article as relative movement between the article-engaging members and the clamp mechanism occurs.

Another feature of the invention relates to a destacking machine having a clamp mechanism to hold a stack of nested articles, and having a stripper mechanism to dislodge the bottom article from the stack. The machine has a stack-supporting member shiftable from an advanced position under the clamp mechanism where the stack is supported for clamping to a retracted position spaced from the first position. An article-receiving surface under said stack-supporting member receives an article dislodged from the stack when the stack-supporting member is in the retracted position. The article-receiving surface supports a dislodged article in the path of the stack-supporting member as the stack-supporting member moves from said retracted position to the advanced position to move the dislodged article laterally from beneath the clamp mechanism.

It is therefore one object of the present invention to provide a positive acting stripper mechanism for a destacking machine which will maintain engagement with the end article in a stack until the article is dislodged from the stack.

It is another object of the present invention to provide a stripper mechanism for a destacking machine in which article-engaging fingers are automatically coordinated with operation of the clamp mechanism.

It is yet another object of the present invention to provide, in a destacking machine, mechanism to discharge dislodged cups into a discharge lane by the same mechanism which advances intermittently to support a stack for clamping.

DESCRIPTION OF THE PREFERRED EMBODIMENT

General Description of Machine and Operation

There is shown in the drawings a machine 38 for destacking (that is, separating) nested articles in the shape of bowls or cups. The particular articles shown for illustrative purposes are plastic cup-shaped bases 10, each of which is to be glued to a plastic top (not shown) to form a plastic bottle assembly. It will be evident, however, that the machine of the present invention can be used for destacking other nested articles, and that the machine disclosed is particularly suited for destacking articles which have no lip, or bead, at the upper edge. The shape of the plastic base 10 is shown best in FIG. 3.

The destacking mechanism includes a feed mechanism 12, a clamp mechanism 14, a stripper mechanism 16, and a discharge mechanism 18 which includes shuttle apparatus 19.

Figures 1, 7:
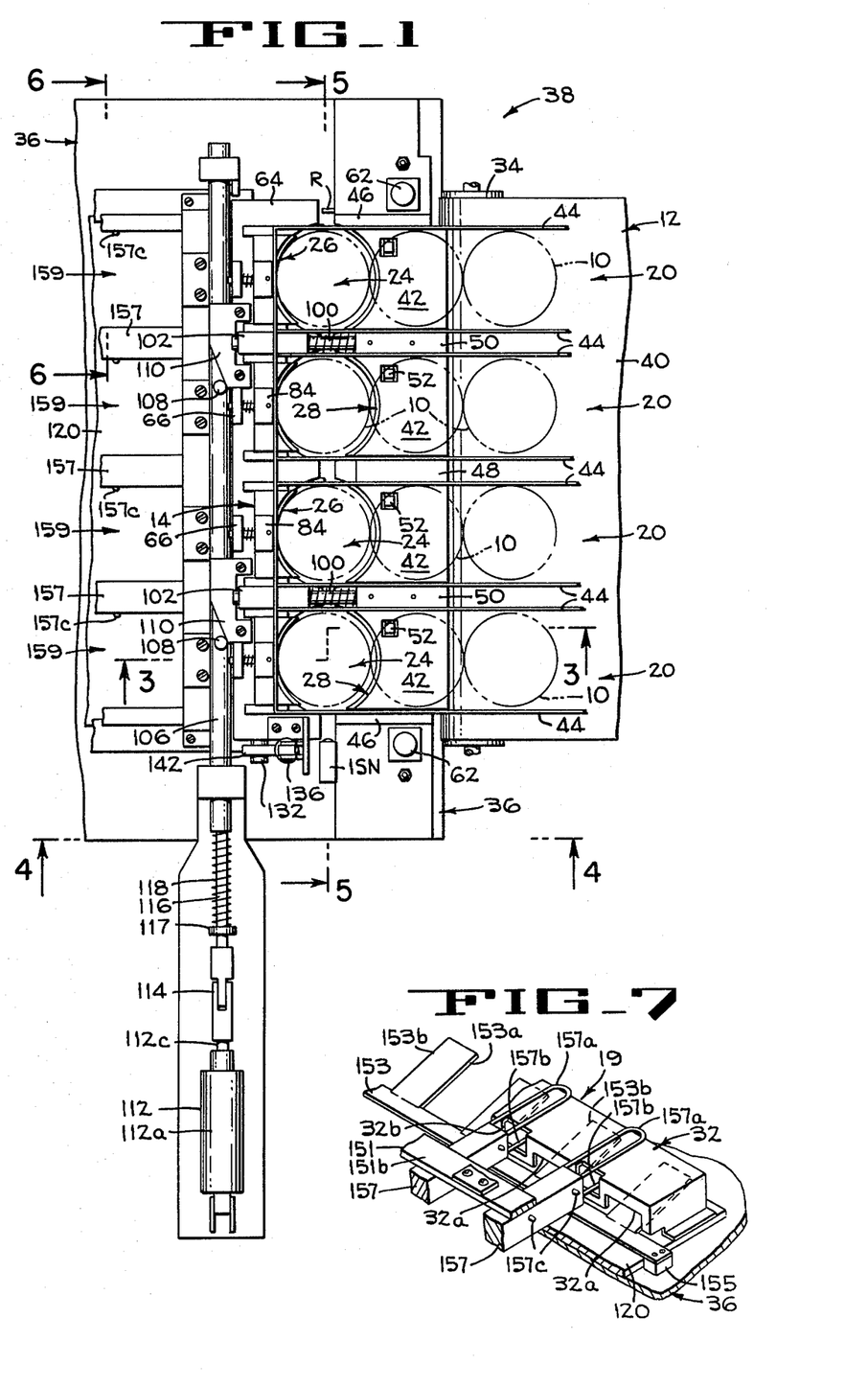
FIG. 1 is a plan view of a destacking machine incorporating the mechanism of the present invention.
FIG. 7 is a view taken in perspective of the shuttle platform and portions of the discharge lanes.

In the feed mechanism 12, a plurality of lanes 20 (four are shown in FIG. 1 although any number may be provided) each receive a plurality of stacks 22 of bases 10. At the downstream end of each lane, the front stack drops through an opening 24 (see FIG. 2), between two jaws 26 and 28 of the clamp mechanism 14 (FIG. 3), onto a shuttle platform 32.

The jaws of the clamp mechanism grip the base article 10 next to the bottom of the stack, the shuttle platform 32 retracts, and the stripper mechanism 16 engages and loosens the base article at the bottom of the stack from the gripped base article (and hence from the stack). The bottom base article drops off the stack in front of the shuttle platform 32 which thereafter advances to a position under the clamp.

The dislodged base article is moved forwardly by the shuttle platform for discharge, and the stack 22 drops onto the platform 32 when released by the clamp jaws. The jaws thereafter grip the next base article (which is next to the bottom of the stack) and the shuttle platform moves rearwardly from under the stack. The stripper mechanism 16 again removes the bottom base article, which is discharged by the next forward advance of the shuttle platform 32.

Feed Mechanism

Referring again to the feed mechanism 12, a roller 34 (FIG. 3) is journaled in the stationary frame 36 of the destacking machine 38. A second roller (not shown) and the roller 34 receive an endless belt 40 thereon. The belt 40 supports the stacks 22 in lanes 20, and one of the belt rollers is selectively rotated by drive motor MTR (FIG. 12) to intermittently advance the stacks 22 toward openings 24. The upper run of the belt 40 extends the full width of the four lanes 20 and ends short of the downstream opening 24 in each lane. The belt nevertheless serves to urge the stacks across a fixed plate 42 (see FIG. 3) which forms a part of the fixed jaw 28. The opening 24 is at the downstream side of plate 42, and stacks moved across the plate 42 drop through the opening.

Figure 3:
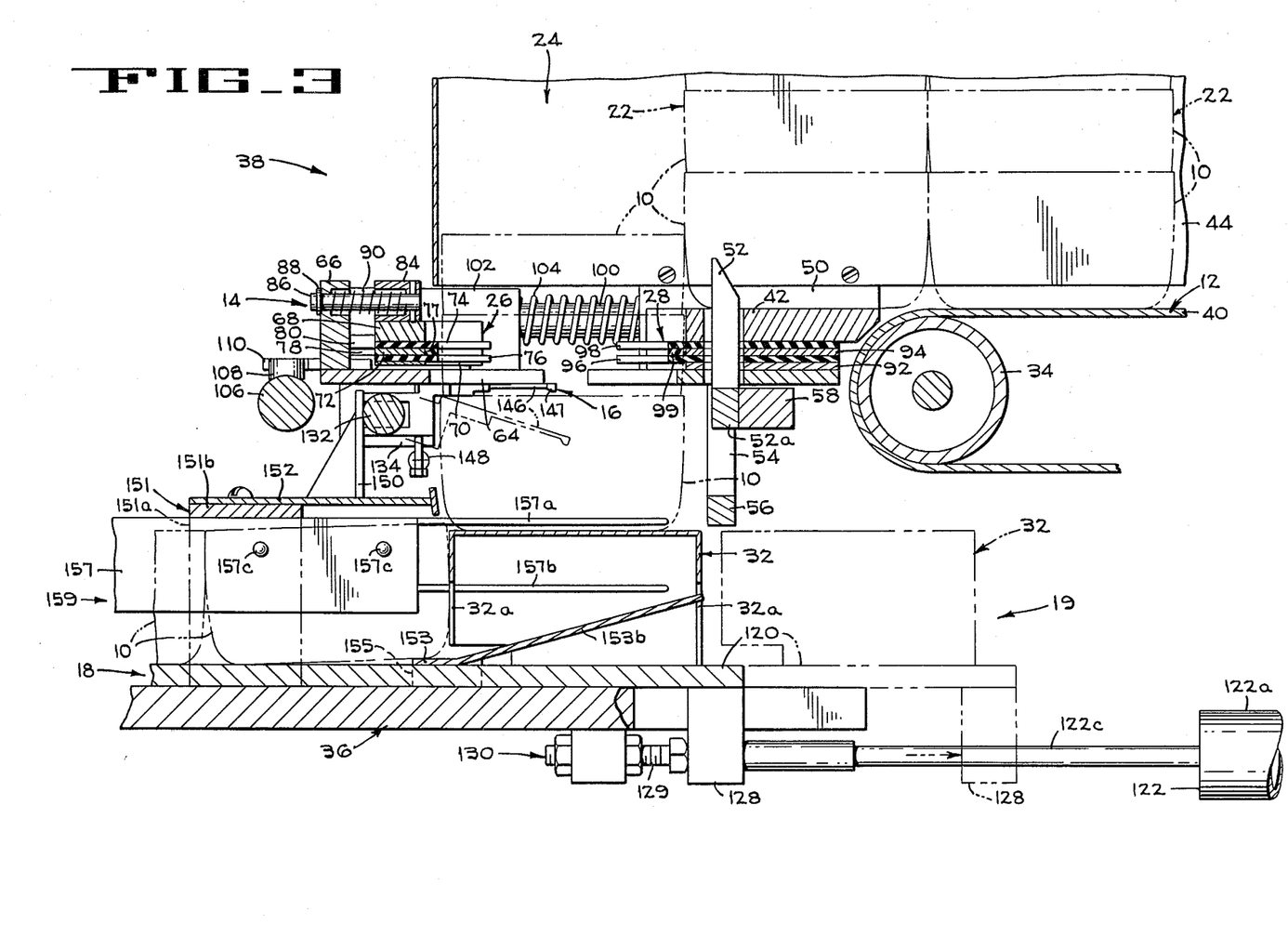
FIG. 3 is a view taken on the line 3—3 of FIG. 1.
Figures 5, 6:
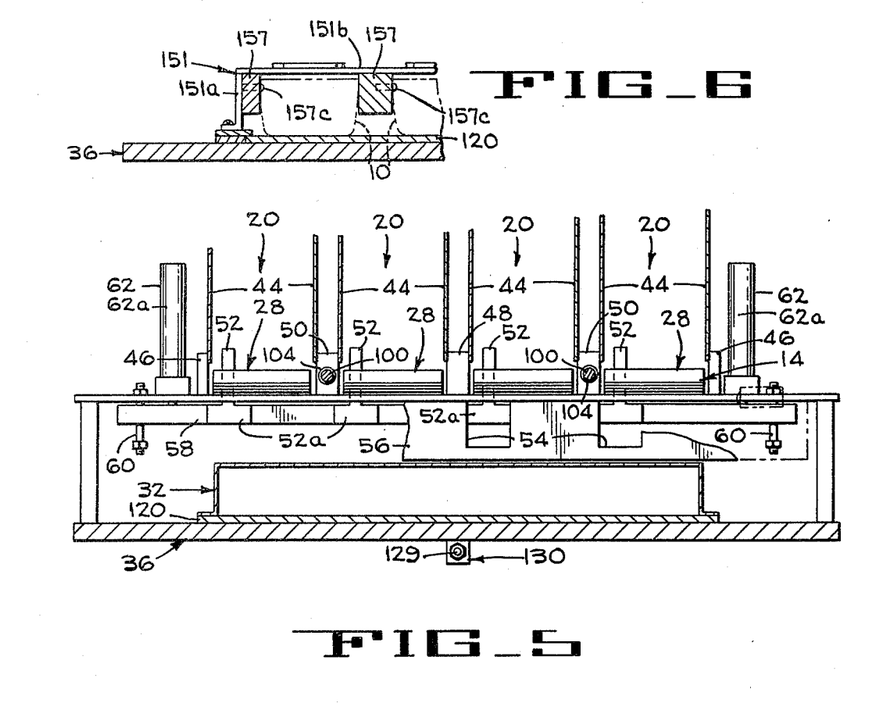
FIG. 5 is a view taken on the line 5—5 of FIG. 1.
FIG. 6 is a view taken on the line 6—6 of FIG. 1.

As shown best in FIGS. 1 and 5, vertical partition walls 44 are secured to blocks 46, 48 and 50 to define the lateral boundaries of the four lanes which receive the stacks 22. Forward movement of the stacks 22 is selectively arrested by stopping the belt motor MTR and concurrently therewith raising movable fingers 52, which extend up through the fixed jaw member 28 (and plate 42 thereof) into each of the lanes 20 (see FIG. 3). The fingers 52 each have a laterally extending base portion 52a which is received with clearance in a slot 54 of a vertical plate 56, as shown in FIGS. 3 and 5. The base portion 52a of each finger is secured to a cross bar 58, which extends across the lanes 20 behind plate 56 and beneath the fixed jaw members 28. As shown in FIG. 5, the cross bar 58 is slidably received on vertical guide bolts 60, which are secured in frame 36. Two pneumatic motors 62 (FIGS. 1 and 11) have cylinders 62a, pistons 62b, and piston rods 62c, the latter of which are secured to the ends, respectively, of the cross bar 58 to raise and lower the cross bar.

Clamp Mechanism

When the forward stack 22 in each lane 20 advances past the fingers 52 to the forward end of the lane 20, the stack drops through opening 24, as shown in FIG. 3. The stack drops between the movable jaw 26 and the fixed jaw 28 of the clamp mechanism 14 (which is open) and falls onto the shuttle platform 32 which, at this time, is directly below the opening 24 and the clamp mechanism 14.

Figure 2:
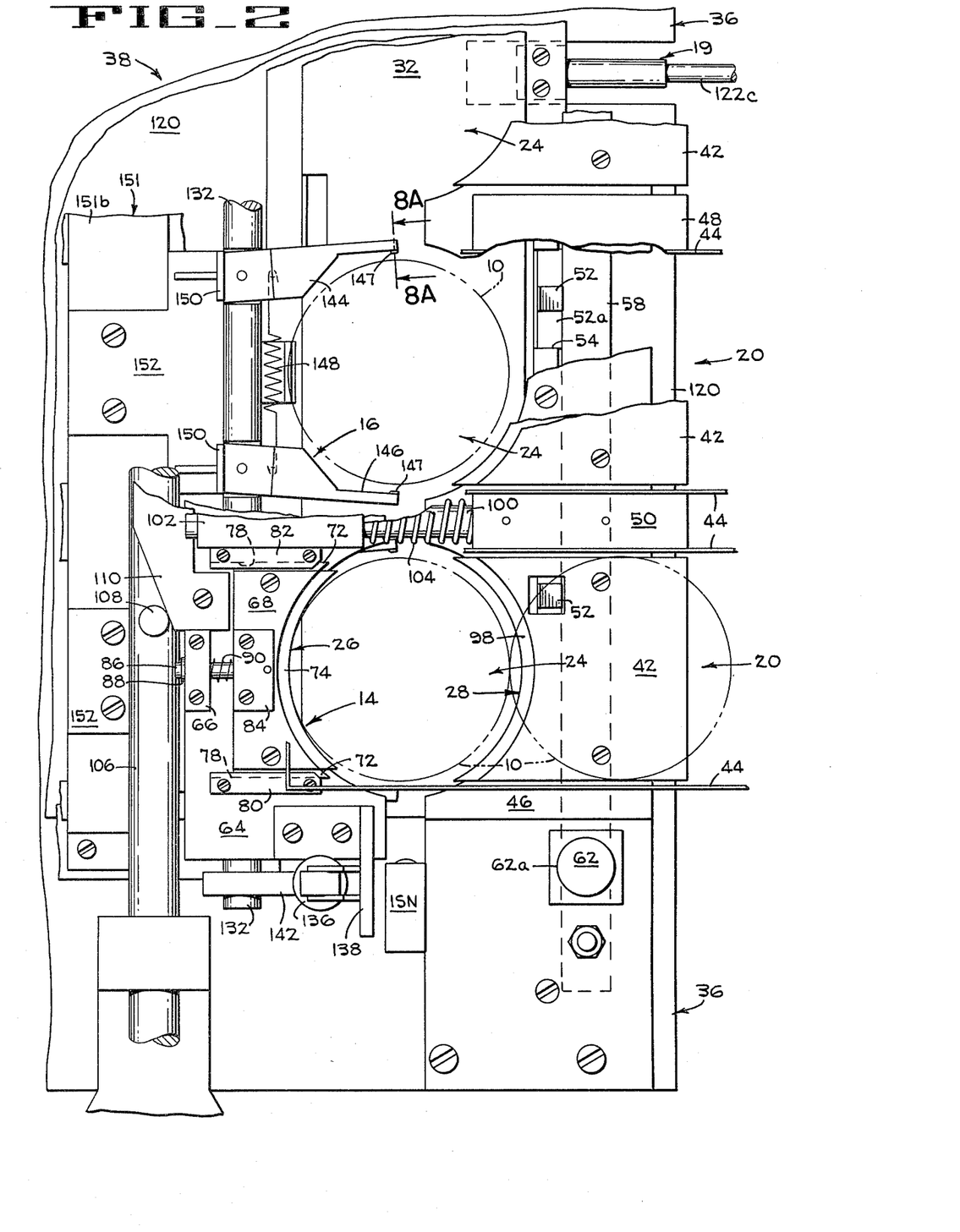
FIG. 2 is an enlarged plan view of a portion of the mechanism of FIG. 1, with parts broken away for clarity.

The structure and operation of the movable jaw 26 can best be understood by reference to FIGS. 2 and 3. The movable jaw 26 is mounted on a movable jaw plate 64 which has an end block 66 secured thereto. The jaw 26 has a top plate 68, a bottom plate 70 and an intermediate spacer plate 72. The bottom plate 70 is spaced from plate 64. An upper rubber jaw pad 74 is sandwiched between top plate 68 and spacer plate 72; a lower rubber jaw pad 76 is sandwiched between spacer plate 72 and bottom plate 70; and an intermediate rubber jaw pad 77 is sandwiched between the inner overhanging edges of pads 74, 76. The spacer plate 72 (FIG. 2) extends laterally beyond the other plates and pads of the jaw and is received, at each side, in a track defined by a longitudinal slot 78 in guide blocks 80 and 82 which are secured to the movable jaw plate 64 (see FIG. 10).

A block 84 (FIG. 2) is secured to the movable jaw 26, and a pin 86 secured in the block 84 (which is in registration with block 66) is slidably received in block 66. The pin 86 extends slidably through block 66 and has a compression spring 90 thereon between the blocks to urge the blocks apart. A washer 88 is secured to the pin 86 beyond the block 66 to limit the separation between blocks 66 and 84.

The fixed jaw 28 of the clamp mechanism (FIG. 3) is mounted on a fixed plate of the frame 36, and has the top plate 42, a bottom plate 92, and a spacer plate 94. Rubber pads 96 and 98 are sandwiched between the top plate and spacer plate, and between the spacer plate and the bottom plate, respectively. A rubber pad 99 is received between the overhanging inner edges of pads 96, 98.

Figure 10:
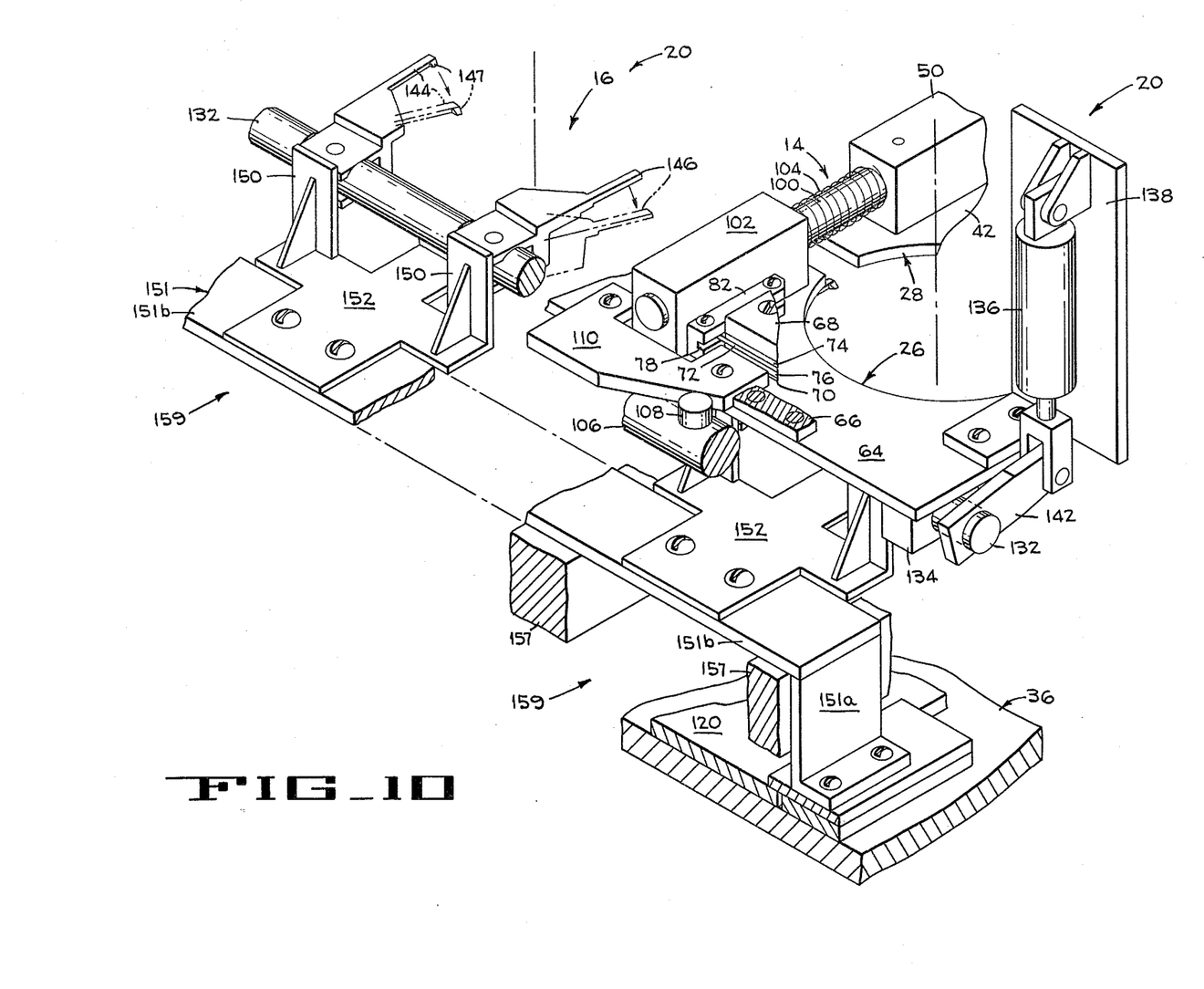
FIG. 10 is a view in perspective of the stripper mechanism showing the movable jaw plate at the end of one loading lane and the stripper fingers at the end of another loading lane.

The blocks 50 which support some of the lane walls 44, are secured to the frame 36, as shown in FIGS. 2, 3 and 10. Rods 100 are secured in the blocks 50 and extend forwardly therefrom into blocks 102 which are secured on the movable jaw plate 64. The rods 100 are slidably received, respectively, in bores in the blocks 102, and a compression spring 104 is received on each rod between the fixed block 50 and the block 102 on the movable jaw. Thus, the rods 100 serve to slidably mount the movable jaw plate 64, and hence the movable jaws 26 on the jaw plate 64.

A reciprocating shaft 106 (FIG. 2) has rollers 108 thereon. Cam plates 110 are secured to the movable jaw plate 64, and extend into the path of the rollers 108. As shown best in FIGS. 1 and 11, a pneumatic motor 112, mounted on frame 36, has a cylinder 112a, a piston 112b, and a piston rod 112c, the latter of which is connected by a coupler 114 to a shaft 116. The shaft 116 is telescopically received inside shaft 106, and a compression spring 118 is received on shaft 116, between a collar 117 thereon and the end of shaft 106. When the piston 112b in motor 112 advances, the shaft 116 is advanced to transmit a force through spring 118 to shaft 106. This force advances shaft 106 to move cam plate 110 rearwardly (to the right as viewed in FIGS. 1 and 2) by means of roller 108. The rearward movement of cam plate 110 moves the jaw plate 64 rearwardly on shaft 100 against the bias of compression spring 104. The rearward movement of jaw plate 64 moves the movable jaw 26 rearward through spring 90. When the piston 112b of motor 112 moves rearwardly, to relax the force on shaft 106, the spring 104 moves the movable jaw 26 forwardly to open the clamp mechanism 14. It should be noted that springs 118 (FIG. 1), 90 and 104 (FIG. 2), provide yieldable forces controlling the movable jaw 26. These yieldable forces prevent excessive forces being applied to the operating mechanism, and particularly to the articles being destacked.

Shuttle Apparatus

Reference has been made heretofore to shuttle apparatus 19 (FIG. 3) which includes the shuttle platform 32 on which the stack 22 of articles 20 lands as it drops through the open clamp mechanism 14. The platform holds the stack at an elevation where the next-from-the-bottom article is in registration with the jaws 26, 28 of the clamp mechanism. When the movable jaw 26 is moved in to close on the next-from-the-bottom article in the stack, the stack (including the bottom article which adheres to the next-from-the-bottom article) is supported by the clamp.

The shuttle platform 32 (FIGS. 3 and 7) is secured to a slide plate 120 which, in turn, is slidably received on a plate of frame 36. The slide plate 120 is reciprocated by a pneumatic motor 122 (FIGS. 3 and 11) comprising a cylinder 122a, a piston 122b and a piston rod 122c. The piston rod extends from the cylinder and is connected by means of bar 128 to the slide plate 120. When the piston of motor 122 is advanced, the slide plate is advanced to a position where bar 128 engages the adjustable screw 129 of a stop 130 connected to frame 36. In this forward position, the shuttle platform 32 is directly under opening 24 at the end of each lane, and under the clamp mechanism 14. When the piston in motor 122 is retracted, the slide plate is retracted to shift the shuttle platform 32 out from under the opening 24 and the clamp mechanism 14.

Stripper Mechanism

After the next-to-the-bottom article has been gripped by the clamp mechanism, the shuttle platform is retracted from under the bottom article. Thereafter, the stripper mechanism 16 (FIGS. 2, 3 and 10) engages the bottom article and removes it from the nested stack.

Figure 4:
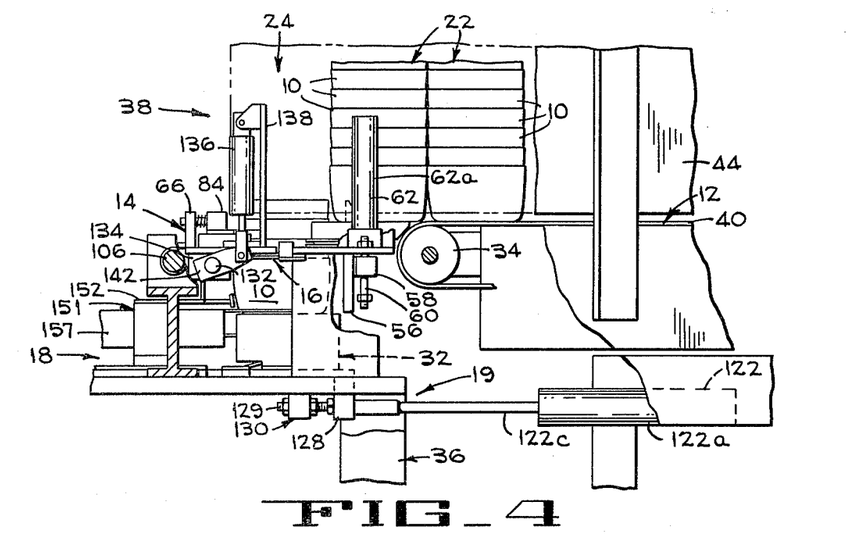
FIG. 4 is a view taken on the line 4—4 of FIG. 1.

The stripper mechanism 16 includes a stripper shaft 132 journaled in blocks 134 which are connected to the underside of the movable jaw plate 64, as shown in FIGS. 3, 4 and 10. It should be noted that FIG. 10, which has parts broken away for clarity, shows the movable jaw plate 64 at the end of one of the loading lanes 20, and the stripper fingers at the end of another loading lane 20. A pneumatic motor 136 (FIGS. 4, 10 and 11) has a cylinder 136a, a piston 136b, and a piston rod 136c. One end of cylinder 136a is connected to bracket 138, which is also mounted on movable jaw plate 64. The piston rod 136c is connected to one end of link 142, the opposite end of which is connected to the stripper shaft 132. Thus, as the motor is operated to extend rod 136c, the shaft 132 is rotated through a predetermined angle (clockwise as viewed in FIG. 4). When the motor is operated to retract rod 136c, the shaft 132 is reversely rotated (counterclockwise as viewed in FIG. 4) through said predetermined angle. The cylinder 136 and shaft 132 define actuating mechanism for the stripper fingers 144, 146.

As shown best in FIG. 2, a pair of the stripper fingers 144, 146 is mounted on the stripper shaft 132 at the end of each lane 20. It will be noted that, in FIG. 2, the movable jaw 26 at the end of one of the lanes 20 is broken away to reveal the stripper fingers 144, 146. A tension spring 148 is connected between the two fingers to pull the two fingers together when they are unrestrained. A backing plate 150 is mounted on the stationary frame 36, as shown in FIGS. 2, 3 and 10, for each finger. More specifically, a bridge 151 has legs 151a secured to frame 36, and has a strip 151b which is supported in spaced relation to frame 36 by the legs. A support plate 152 is secured to strip 151b for each pair of fingers, and the backing plates 150 are secured to the support plate 152. The backing plate 150 is engaged by the forward end of the finger, which is cut on an angle, when the movable jaw plate 64 is in its extreme forward position, as shown best in FIG. 2. When the beveled end of each finger engages the backing plate, the two fingers move outwardly against the bias of spring 148. When the movable jaw plate 64 moves rearwardly (toward the fixed jaw 28) to close the clamp mechanism and move the fingers away from backing plates 150, the two stripper fingers close to engage the next from the bottom article (the gripped article) over the upper edge of the bottom article.

Figure 8A:
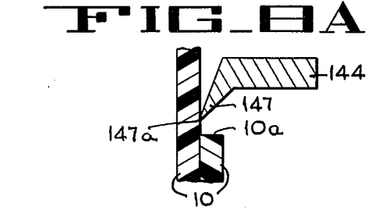
FIG. 8A is a view taken on the line 8A—8A of FIG. 2 showing the fingers before engagement with the bottom article.
Figure 8B:
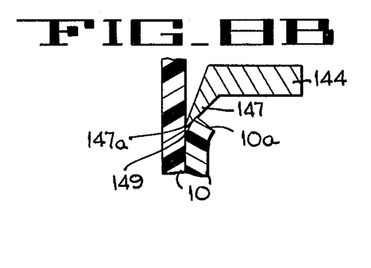
FIG. 8B is a view taken as the view of FIG. 8A showing the fingers after engagement with the bottom cup.
Figure 9:
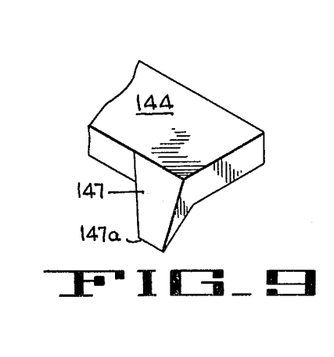
FIG. 9 is a view in perspective of the sharp, chisel edge of a stripper finger.

Each finger 144, 146 has an inwardly and downwardly extending blade 147 as shown in FIGS. 8A, 8B and 9 with a chisel edge 147a. The blades of the fingers are initially urged into engagement with the sides of the next-to-the-bottom cup by spring 148 as the movable jaw 26 is closed, as shown in FIG. 8A. As the actuating mechanism lowers the fingers to the bottom cup, the blades penetrate the interstice 149 between the bottom cup and the next-to-the-bottom cup as shown in FIG. 8B. The chisel edge separates the upper portion of the bottom cup 10 from the next-to-the-bottom cup to provide a positive, overlapping grip between the fingers and the upper rim 10a of the bottom cup. This positive grip minimizes the possibility of the fingers slipping off the bottom cup before the cup is dislodged from the next-to-the-bottom cup. As the stripper shaft 132 continues its rotation, the fingers 144, 146 continue downwardly to dislodge the bottom article from the next-to-the-bottom article.

Discharge Mechanism

As shown in FIGS. 3 and 7, a transverse plate 153 is mounted on the frame 36, but in spaced relation thereto, by means of blocks 155. The plate is cut out at 153a to define rearwardly extending stationary ramps 153b which are inclined with respect to the remainder of the plate. The plate 120, on which the shuttle platform 32 is mounted, slides on frame 36 between the blocks 155 (and under plate 153) in response to the reciprocation of pneumatic motor 122. The shuttle platform 32 (see FIG. 7) is cut away, as at 32a, so that it can slide over the ramps 153b without interference therewith.

When the bottom article is dislodged by the fingers 144, 146 from the next-to-the-bottom article (which is held by the clamp mechanism 16), the shuttle platform 32 is retracted, exposing the stationary ramps 153b. The dislodged articles drop on the ramps and may slide down, or part way down, the ramps. The purpose of the ramps, however, is not to propel the dislodged articles forward by gravity, and hence it is not important that they slide down the ramps when they land. Instead, the shuttle platform 32 moves forward (to receive the stacks when they are released by the clamps) and push the dislodged cups 10 forward.

The ramps, however, serve a useful function. In the event that one or more stacks have fewer cups than an adjacent stack, or stacks, the final cup of the short stack or stacks will drop to the shuttle platform while another stack has the next-to-the-bottom cup gripped by the clamp mechanism. When the shuttle platform retracts, the final cup of the short stack is stripped off the platform 32 as the platform moves under the guide plate 56 (FIG. 3), which thus defines a stripper member. If the platform 153b were not under the retracting platform 32, the cup 10 would tumble off the platform and possibly land on one side or upside down. However, with the ramp construction illustrated, the cup drops right-side-up onto the ramp for subsequent advance by the next advance of the shuttle platform.

Longitudinally extending bars 157 are secured to the bottom of strip 151b, and extend normal thereto in parallel relation as shown in FIG. 7. Upper and lower looped guide rods 157a, 157b (FIG. 7) extend rearwardly from bars 157. An opening 32b in shuttle platform 32 permits the platform to advance to its extreme forward position without interference with the lower rod loop 157b. The bars 157, and the rearwardly extending looped guide rods 157a, 157b, define lateral guides of discharge lanes 159 for the dislodged cups. The cups from each stack are dislodged one-at-a-time and are advanced, in steps, by the reciprocating shuttle mechanism, to form a row of cups between the lateral guides, said row supported by the reciprocating plate 120. It will be noted that small, fixed studs 157c extend laterally from both sides of bars 157 (except the end bars which have studs 157c only on the inner surface thereof). As the cups are advanced, by the advance of the shuttle platform, between the studs, the cups deflect slightly and pass the studs. On retraction of the plate 120, the cups are held by the studs to prevent retraction of the cups.

Pneumatic Circuit

Figure 11:
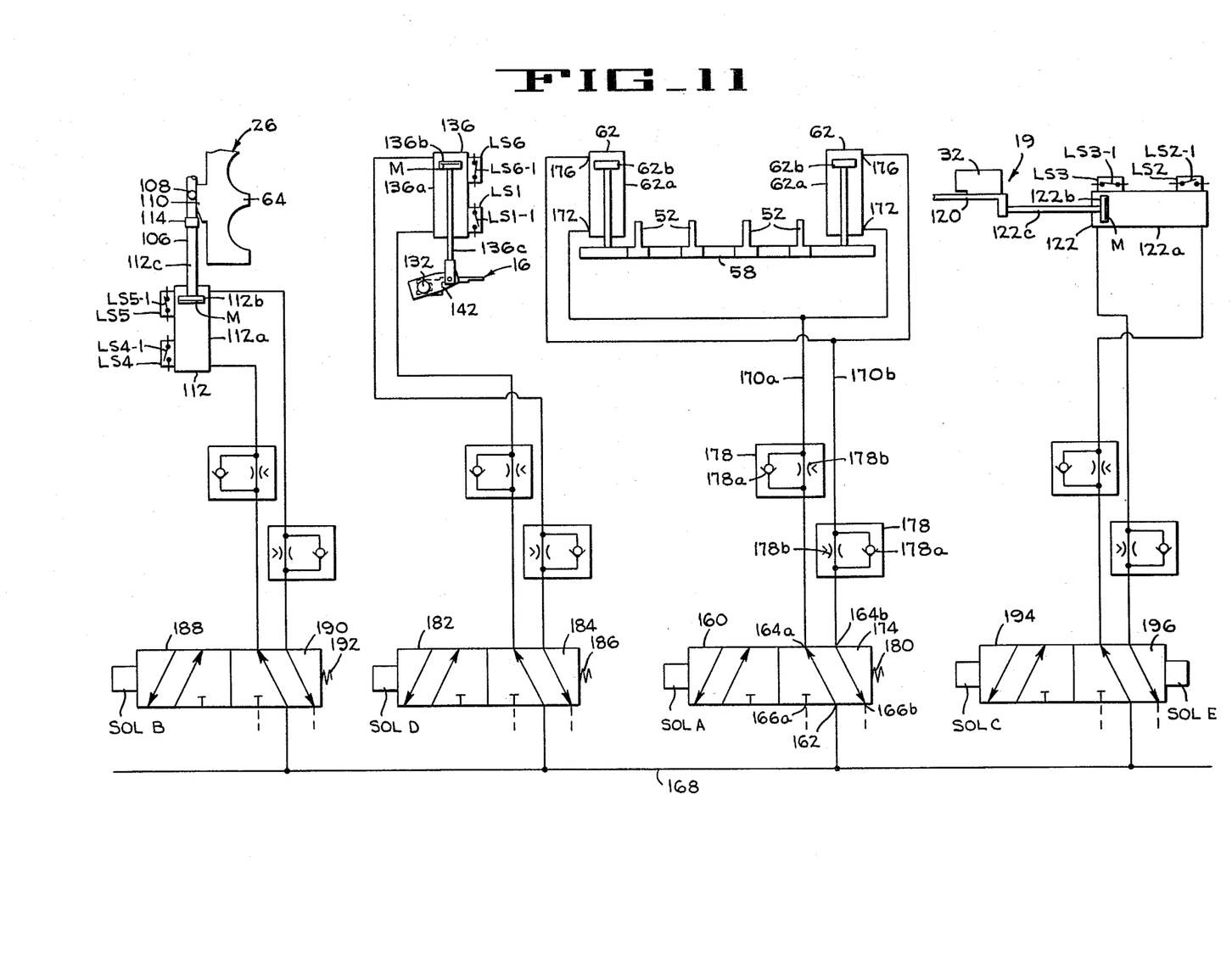
FIG. 11 is a schematic hydraulic diagram of the machine of FIG. 1.

As shown in FIG. 11, each of the pneumatic motors 62, 112, 122 and 136 is operated by a solenoid valve. A valve 160 has a pressure port 162, two motor ports 164a, 164b, two exhaust ports 166a, 166b, and a shiftable valve member 174. Air under pressure from a pressure line 168 is introduced into pressure port 162 for communication through the valve to either motor port 164a or motor port 164b. A first motor line 170a is connected between the motor port 164a and retract ports 172 in cylinders 62a (that is, ports where pressure causes a retraction of the piston rods). A second motor line 170b is connected between the motor port 164b and extend ports 176 in the cylinders 62a (that is, ports where pressure causes an extension of the piston rods). Each motor line 170a, 170b has a rate control valve 178 wherein air flowing toward the motor passes rapidly through a check valve 178a and air from the motor is forced through a restriction 178b to control the speed of the piston.

When the solenoid SOL A is deenergized, and the valve 160 is in the position shown in FIG. 11, pressure is supplied through line 168, valve member 174, motor line 170a to motor ports 172, urging the pistons 62b upward to raise the stops 52. At the same time, air is exhausted through ports 176, line 170b, valve member 174, and exhaust port 166b.

When solenoid SOL A is energized, the valve member 174 is shifted to the right, against the force of spring 180, and the pressure port 162 is connected through valve member 174 to motor port 164b. Air under pressure is therefore directed to motor ports 176 to lower the pistons 62b and lower the stops 52 out of the paths of stacks 22. At the same time, air is exhausted through ports 172, line 170a, valve member 174 to discharge port 166a. When solenoid SOL A is deenergized, the valve member is shifted back by spring 180 to the position shown in FIG. 11 to again raise the pistons, and bar 58.

A valve 182 operates the cup stripping cylinder 136 in a manner similar to the operation of the cup stack release motors 62 by valve 160. The valve 182, which is identical to valve 160, has a solenoid SOL D. When the solenoid SOL D is deenergized, the shiftable valve member 184 is in the position shown, and the piston rod 136c is retracted to elevate the stripper fingers. When the solenoid SOL D is energized to shift the valve member 184 against the spring 186, the piston rod is extended to lower the stripper fingers and strip the bottom cup from the stack.

Similarly, a valve 188 operates the cup clamping cylinder 112. The valve 188, which is identical to valve 160, has a solenoid SOL B. When the solenoid SOL B is deenergized, the shiftable valve member 190 is in the position shown, and the piston rod 112c is extended to close the movable clamp jaw member 26. When the solenoid SOL B is energized to shift the valve member 190 against the spring 192, the piston rod is retracted to permit the clamp mechanism to open.

A valve 194, which controls the operation of the shuttle platform, is similar to valve 160 except that it is controlled by solenoids at each end (SOL E and SOL C), instead of a solenoid and a spring. When the shiftable valve member 196 is shifted to the position shown by the energization of solenoid SOL E (with solenoid SOL C deenergized), the piston rod extends to advance the shuttle platform 32 to a position under the clamp mechanism 14. When solenoid SOL C is energized (with solenoid SOL E deenergized), the piston rod 122c is retracted to retract the shuttle platform 32. With neither solenoid SOL E, SOL C energized, the valve member will remain in one or the other extreme position to which it was last shifted.

Electrical Circuit

Figure 12:
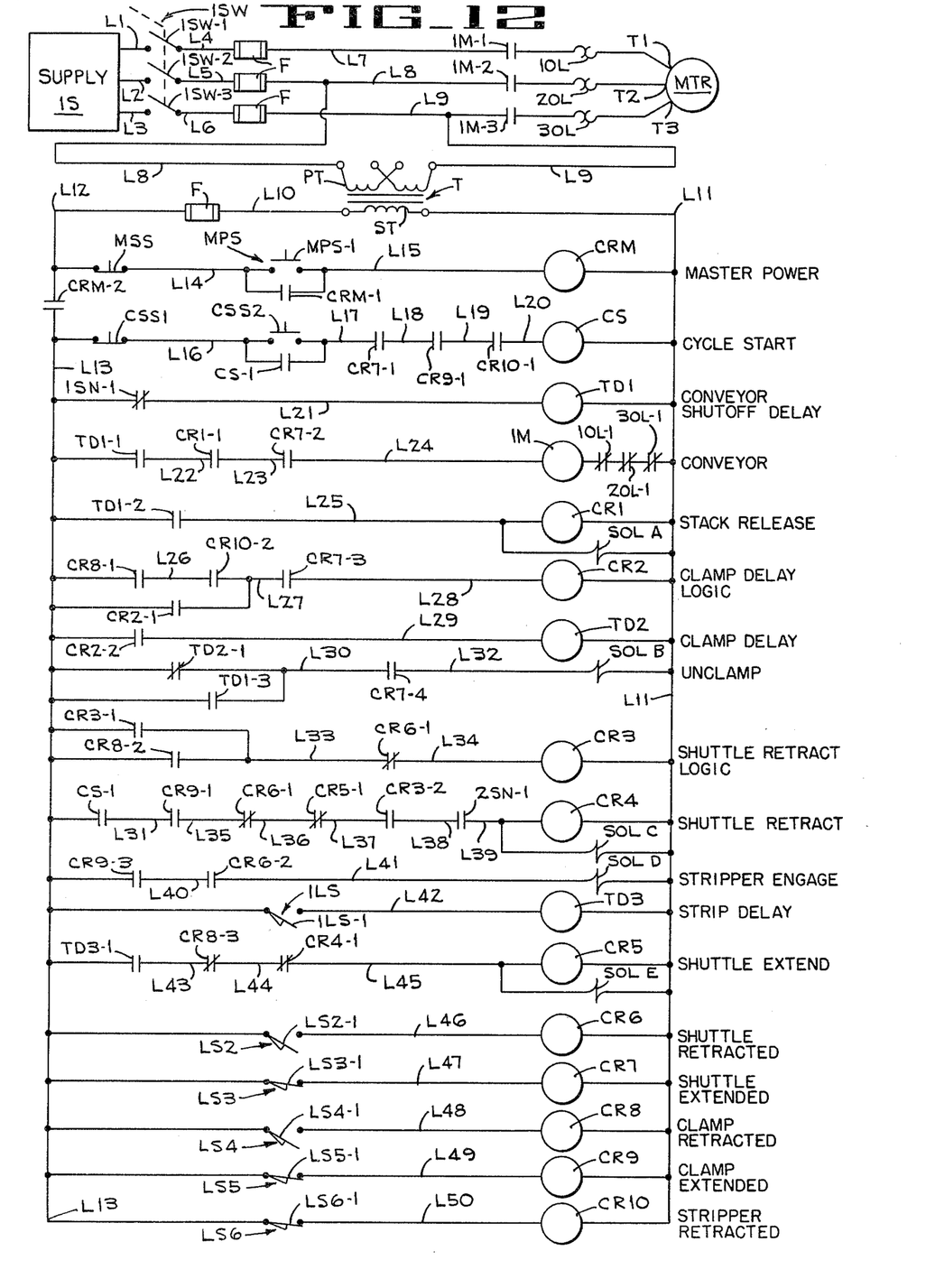
FIG. 12 is a schematic electrical diagram of the machine of FIG. 1.

In the circuit of FIG. 12, a three phase source of power 1S is connected, through lines L1, L2 and L3, to one of the contacts of the three sets of contacts 1SW-1, 1SW-2 and 1SW-3, respectively, of a switch 1SW. The other contacts of said sets of contacts are connected, respectively, through lines L4, L5 and L6 to fuses F. The fuses F are connected through lines L7, L8 and L9 to one of the contacts of the normally open sets of contacts 1M-1, 1M-2 and 1M-3, respectively, of a relay 1M. The opposite contacts of said sets of contacts 1M-1, 1M-2 and 1M-3 are connected to overload relays 10L, 20L and 30L, respectively, which, in turn, are connected to the terminals T1, T2 and T3 of the cup stacks supply conveyor motor MTR.

The primary PT of a transformer T is connected across lines L8 and L9, and the secondary ST of the transformer T is connected, at one end, to line L11 and, at the opposite end, to one end of fuse F through line 10. The opposite end of fuse F is connected to line L12.

The master power branch of the circuit, which is connected between lines L11 and L12, has a normally closed master stop switch MSS connected between lines L12 and L4, and has the normally open contacts MPS-1 of master power switch MPS connected between line L14 and a line L15. Relay CRM is connected between lines L15 and L11. Self sealing contacts CRM-1 of relay CRM are connected across the contacts MPS-1.

A line L13 is connected to line L12 through normally open contacts CRM-2 of relay CRM. The cycle start branch of the circuit, which is connected between lines L13 and L11, includes a normally closed cycle stop switch CSS1 connected between lines L13 and L16. A normally open cycle start switch CSS2 is connected between lines 16 and 17; normally open contacts CR7-1 of relay CR7 are connected between lines L17 and L18; normally open contacts CR9-1 of relay CR9 are connected between lines L18 and L19; normally open contacts CR10-1 of relay CR10 are connected between lines L19 and L20; and relay CS is connected between lines L20 and lines L11. Normally open contacts CS-1 of relay CS are connected around the cycle start switch CSS2.

The conveyor shut-off delay branch of the circuit is connected between lines L13 and L11. Normally closed contacts 1SN-1 of cup supply sensor 1SN are connected between lines L13 and L21; off delay relay TD1 is connected between lines L21 and L11. The sensor 1SN (FIG. 1) casts a beam of light between the jaws of the clamp mechanisms to reflector R to detect the presence of cups.

The conveyor branch of the circuit is connected between lines L13 and L11 and includes normally open contacts TD1-1 of relay TD1 connected between L13 and L22; normally open contacts CR1-1 of relay CR1 connected between lines L22 and L23; normally open contacts CR7-2 of relay CR7 connected between lines L23 and L24; and relay 1M and normally closed contacts 10L-1, 20L-1, 30L-1 (of overload relays 10L, 20L and 30L, respectively) connected in series between the relay 1M and line L11.

The stack release branch of the circuit is connected between lines L13 and L11 and includes the following elements: normally open contacts TD1-2 of relay TD1 connected between lines L13 and L25; and relay CR1 connected between lines L25 and L11. Solenoid SOL A is also connected between the lines L25 and L11.

The clamp delay logic branch of the circuit, which is connected between lines L13 and L11, has normally open contacts CR8-1 of relay CR8 connected between lines L13 and L26; normally open contacts CR10-2 of relay CR10 connected between lines L26 and L27; normally open contacts CR7-3 of relay CR7 connected between lines L27 and L28; and relay CR2 connected between lines L28 and L11. Normally open contacts CR2-1 of relay CR2 are connected between lines L13 and L27 (around contacts CR8-1 and CR10-2).

The clamp delay branch of the circuit consists of normally open contacts CR2-2 of relay CR2 connected between lines L13 and L29 and relay TD2 connected between lines L29 and L11.

The unclamp circuit branch includes the normally closed contacts TD2-1 connected between lines L13 and L30; the normally open contacts CR7-4 connected between lines L30 and L32; and solenoid SOL B connected between lines L32 and L11. Normally open contacts TD1-3 are connected between lines L13 and L30 across contacts TD2-1.

The shuttle retract logic branch has normally open contacts CR8-2 connected between lines L13 and L33. Normally closed contacts CR6-1 are connected between lines L33 and L34; and relay CR3 is connected between lines L34 and L11. Normally open contacts CR3-1 are connected across contacts CR8-2.

The shuttle retract circuit branch comprises in series: normally open contacts CS-1 connected between lines L13 and L31; normally open contacts CR9-2 connected between lines L31 and L35; normally closed contacts CR6-1 connected between lines L35 and L36; normally closed contacts CR5-1 connected between lines L36 and L37; normally open contacts CR3-2 connected between lines L37 and L38; normally open contacts 2SN1 of sensor 2SN connected between the lines L38 and L39; and relay CR4 connected between lines L39 and L11. Solenoid SOL C is also connected between lines L39 and L11. The sensor 2SN is mounted in a magazine (not shown) in which separated cups are stored. The contacts 2SN1 close when the magazine is full.

The stripper engage circuit branch has connected in series normally open contacts CR9-3 (between lines L13 and L40); normally open contacts CR6-2 (between lines L40 and L41); and solenoid SOL D (between lines L41 and L11).

The strip delay circuit consists of series connected normally open limit switch contacts 1LS-1 of limit switch 1LS (between lines L13 and L42) and relay TD3 (between lines L42 and L11).

The shuttle extend circuit comprises the following elements connected in series: normally open contacts TD3-1 (between lines L13 and L43); normally closed contacts CR8-3 (between lines L43 and L44); normally closed contacts CR4-1 between lines L44 and L45; and relay CR5 (between lines L45 and L11). Solenoid SOL E is also connected between lines L45 and L11.

The shuttle-retracted circuit branch comprises series connected normally open limit switch contacts LS2-1 of limit switch LS2 (between lines L13 and L46) and relay CR6 (between lines L46 and L11).

The shuttle extended circuit branch comprises series connected normally open limit switch contacts LS3-1 of limit switch LS3 (between lines L13 and L47) and relay CR7 (between lines L47 and L11).

The clamp retracted circuit branch consists of the serially connected normally open limit switch contacts LS4-1 of limit switch LS4 (between lines L13 and L48) and relay CR8 (between lines L48 and L11).

The clamp extended circuit branch consists of the serially connected normally open limit switch contacts LS5-1 of limit switch LS5 (between lines L13 and L49) and relay CR9 (between lines L49 and L11).

The stripper retracted circuit branch consists of the serially connected normally open limit switch contacts LS6-1 of limit switch LS6 (between lines L13 and L50) and relay CR10 (between lines L50 and L11).

Operation

For purposes of describing the operation of the machine disclosed herein, assume that initially the cup fingers 52 are elevated (motors 62 in position shown in FIG. 11; solenoid SOL A of valve 160 deenergized) and no cups are present in the machine downstream from the fingers. Therefore, a beam projected from the sensor 1SN strikes the reflector R adjacent the other end of the openings without interference from a cup. Thus, the beam is reflected back to the sensor 1SN, which has a photosensitive cell therein, to generate a signal. The signal thus generated is inverted so that the normally closed switch contacts 1SN-1 (FIG. 12) are held closed.

When the master start contacts MPS-1 are closed by the operator, the relay CRM is energized to close contacts CRM-1 and CRM-2. The closing of these contacts seals in the relay CRM and connects the line L13 to the secondary of transformer T.

When line L13 is connected to the transformer T, the off delay relay TD1 is energized to close contacts TD1-1 and TD1-2. As contacts TD1-2 close, relay CR1, and solenoid SOL A, are energized. The energization of solenoid SOL A shifts valve 160 to lower the fingers 52. It will be noted that each piston 136b, 112b, and 122b has a magnet M therein so that the contacts of the limit switches on the cylinders are pulled closed when the piston is shifted adjacent the limit switch contacts. At this time, the shuttle piston 122b (FIG. 11) is extended to hold contacts LS3-1 of limit switch LS3 closed. With limit switch contacts LS3-1 closed, relay CR7 became energized when line L13 was connected to the transformer. Consequently, at this time, normally open contacts TD1-1, CR1-1, and CR7-2 are closed to energize conveyor relay 1M. When relay 1M becomes energized, contacts 1M-1, 1M-2 and 1M-3 become energized to start motor MTR and the conveyor belt 40.

At the same time, solenoid SOL B is energized through normally open contacts TD1-3 and normally open contacts CR7-4 to shift valve 188 and open the cup clamp mechanism 14. As the clamp mechanism opens, contacts LS4-1 close to energize relay CR8 and close contacts CR8-2. Since normally closed contacts CR6-1 are closed at this time, relay CR3 is energized.

Figure 13:
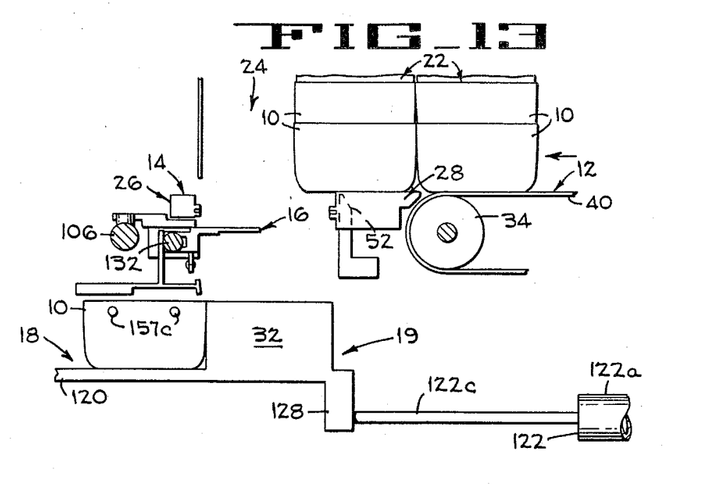
FIGS. 13 to 19 are schematic diagrams illustrating the operation of the machine of FIG. 1.
Figure 14:
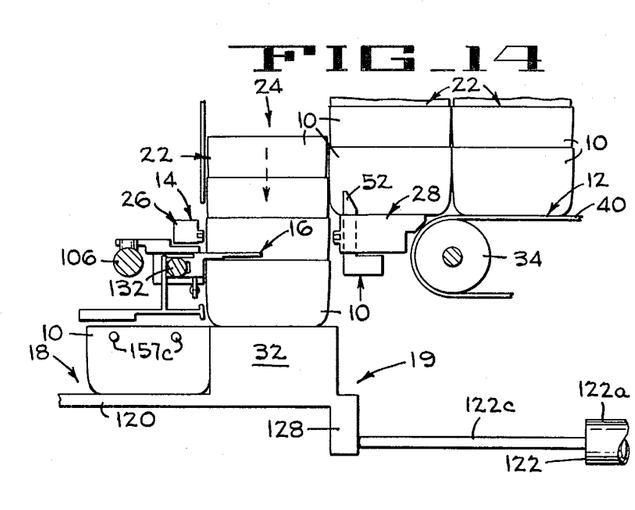
Figure 15:
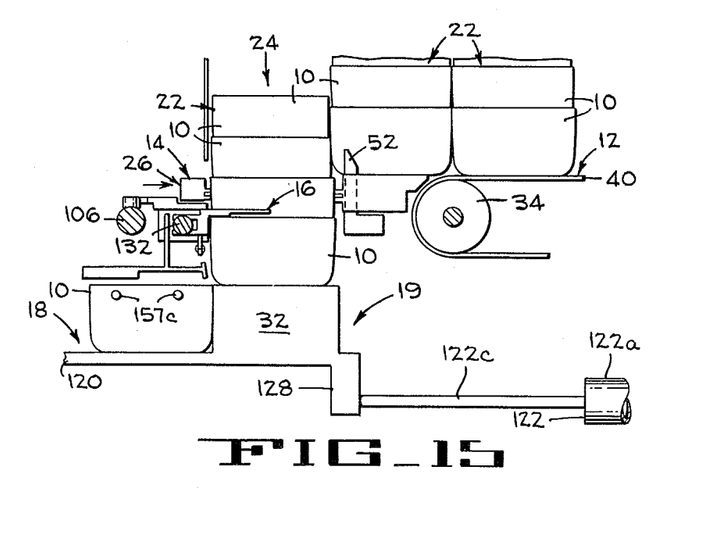

The conveyor 40 carries four stacks 22 of cups into the four openings 24 to drop onto the shuttle platform 32, as shown in FIGS. 13 and 14. After relay TD1 times out, contacts TD1-1 open to deenergize relay 1M and stop the conveyor; contact TD1-2 opens to drop relay CR1 and deenergize solenoid SOL A to lift fingers 52; and contacts TD1-3 open to deenergize solenoid SoL B to close the clamp mechanism on the next-to-the-bottom cup of the stacks, as shown in FIG. 15. The deenergization of solenoid SOL A shifts valve 160 back to the position shown in FIG. 6 to raise fingers 52.

Figure 16:
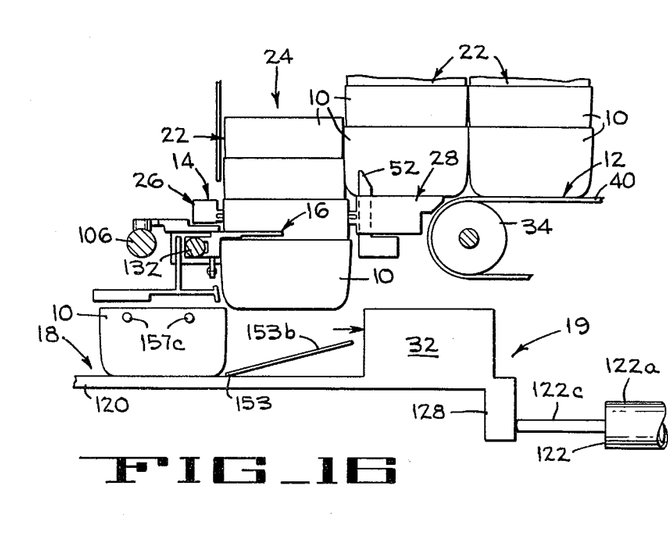
Figure 17:
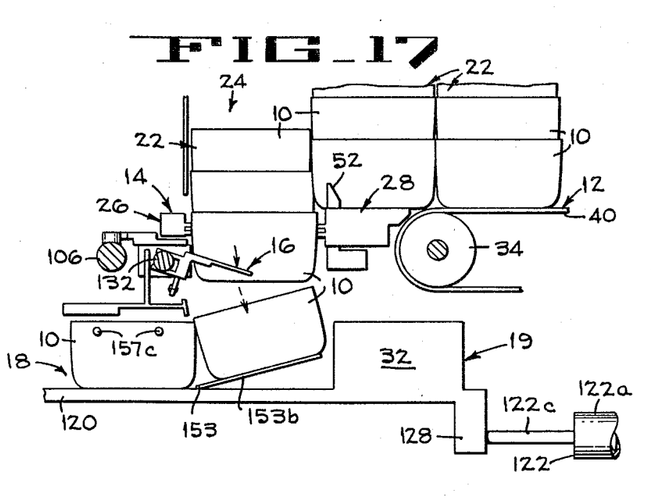

At this time the machine is in condition to begin cycling, and the operator depresses the cycle start switch CSS2. Since limit switch contacts LS3-1, LS5-1, and LS6-1 are closed at this time (shuttle 32 extended, clamp mechanism 14 closed, and stripper fingers 144, 146 up) the relay CS is energized. When relay CS becomes energized, contacts CS-1 close. At this time relay CR8 is energized (since the clamp mechanism is closed to close switch LS4) and relay CR6 is deenergized (because the shuttle 32 is advanced and switch contacts LS2-1 are open). Consequently, relay CR3 is energized. At this time a signal from a sensor in a downstream storage area (not shown) indicates the area is not full. This signal closes switch contacts 2SN1. Thus relay CR4 and solenoid SOL C become energized, and valve 194 is shifted to retract the shuttle 32 as shown in FIG. 16. When the shuttle retracts, limit switch contacts LS2-1 close to energize relay CR6. Since contacts CR9-3 are closed at this time, solenoid SOL D is energized through contacts CR9-3 and CR6-2 to lower the stripper fingers and dislodge the bottom cup 10 from the stack 22, as shown in FIG. 17.

When the stripper fingers are fully down, limit switch contacts LS1-1 close and relay TD3 is energized. After a delay, contact TD3-1 close to energize relay CR5 and solenoid SOL E.

Figure 18:
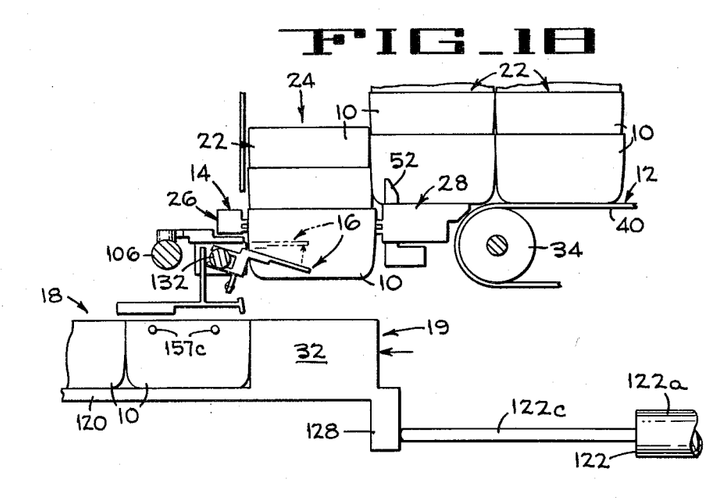

When solenoid SOL E is energized, the valve 194 returns to the position shown in FIG. 11, and the shuttle 32 once more extends to advance the discharged cup from under the clamp mechanism, as shown in FIG. 18. As the shuttle begins its extension, switch contacts LS2-1 open, and solenoid SOL D is deenergized. With solenoid SOL D deenergized, the valve 182 returns to the position shown in FIG. 11, and the stripper fingers are raised.

Figure 19:
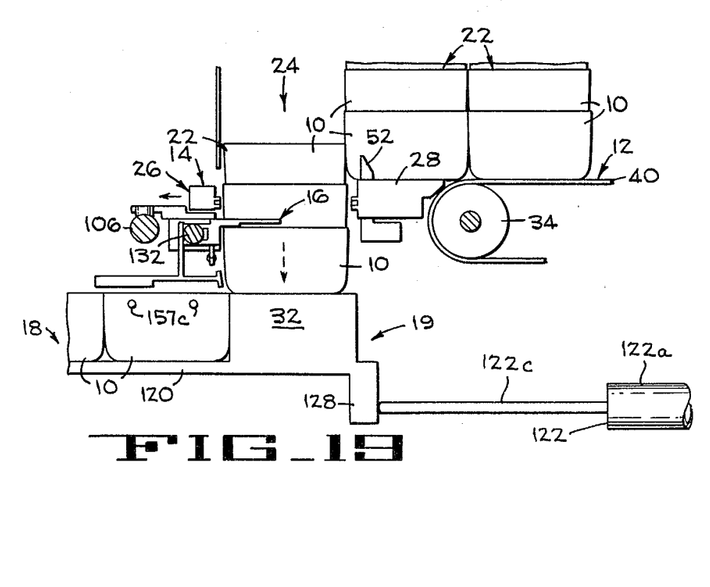

After the shuttle is fully extended, switch contacts LS3-1 close and relay CR7 is again energized. Thus, solenoid SOL B is again energized to unclamp the stack of cups which drop to the shuttle platform 32, as shown in FIG. 19. When the clamp retracts, switch contacts LS4-1 close to energize relay CR8. The energization of relay CR8 closes contacts CR8-1 to energize relay CR2. Thus, contacts CR2-2 close to energize clamp delay relay TD2. When relay TD2 times out, normally closed contacts TD2-1 open to deenergize solenoid SOL B to shift valve 188 back to the position shown in FIG. 11. Thus, the clamp mechanism again closes on the next-from-the-bottom cup of the stacks (see FIG. 15).

The cycle will continue until either the cycle stop button CSS1 is depressed, or until the contacts 2SN1 open because the downstream storage area is full. When either of these events occurs, the shuttle will extend and the cycle will stop.

Although the best mode contemplated for carrying out the present invention has been herein shown and described, it will be apparent that modification and variation may be made without departing from what is regarded to be the subject matter of the invention.

What is claimed is:

1. Stripper mechanism in a destacking machine having a frame and having a base shiftable with respect to said frame, said stripper mechanism adapted to dislodge the end article in a nested stack which is held by a clamp mechanism engaging said stack beyond said end article, said stripper mechanism having actuating member and having article-engaging members to engage the end article for dislodgment thereof on operation of said actuating member, the improvement wherein said actuating member is mounted on said base and said base is shiftable toward and away from said stack, said article-engaging members pivotally mounted on said actuating member in spaced apart relation to straddle said stack, means to bias said article-engaging members together to engage the stack when said base is advanced toward the stack, and stop means mounted on the frame to engage said article-engaging members on retraction of said base from the stack to force said article-engaging members apart.

2. The mechanism of claim 1 wherein said actuating member comprises a shaft and said article-engaging members comprise fingers.

3. The mechanism of claim 1 wherein said means to bias said article-engaging members together comprises a spring connected between said fingers.

4. The mechanism of claim 1 wherein said article-engaging members are elongated fingers and wherein said stop members have flat surfaces extending perpendicular to said fingers, the ends of the fingers inclined with respect to a line parallel to the surfaces of the stop members to urge the fingers apart when the ends of the fingers engage the stop members on retraction of said base.

5. Stripper mechanism in a destacking machine having a frame and having a base shiftable with respect to said frame, said stripper mechanism adapted to dislodge the end article in a nested stack which is held by a clamp mechanism engaging said stack beyond said end article, said stripper mechanism having an actuating member and having article-engaging members to engage the end article for dislodgment thereof on operation of said actuating member, the improvement wherein said article engaging members have sharp edges and wherein said actuating member is mounted on said base and said base is shiftable toward and away from said stack, said article-engaging members pivotally mounted on said actuating member in spaced apart relation to straddle said stack, means to bias said article-engaging members together to engage the stack when said base is advanced toward the stack, means to operate said actuating member to move said article-engaging members toward said bottom article to push said sharp edges between the end article and the next-to-the-end article of the stack and dislodge said end article from the stack, and stop means mounted on the frame to engage said article-engaging members on retraction of said base from the stack to force said article-engaging members apart.

6. In a destacking machine having a clamp mechanism to grip a stack of nested articles above the bottom article, and having a stripper mechanism to dislodge the bottom article from the stack, said machine having a stack-supporting member shiftable from an advanced position under the clamp mechanism where the stack is supported for clamping to a retracted position, the improvement comprising an inclined ramp under the clamp mechanism, the stack-supporting member shiftable over the ramp to engage a dislodged article thereon, and a stripper member behind the advanced position of the stack-supporting member to strip a dislodged article therefrom onto the ramp.

7. In a destacking machine having a clamp mechanism to hold a stack of nested articles, and having a stripper mechanism to dislodge the bottom article from the stack, said machine having a stack-supporting member shiftable from a first position under the clamp mechanism where the stack is supported for clamping to a second position spaced from the first position, the improvement comprising a stationary ramp under said stack-supporting member to receive an article dislodged from the stack when the stack supporting member is in the second position, said stationary ramp supporting a dislodged article in the path of the stack-supporting member as the stack-supporting member moves from said second position to the first position to discharge said article laterally from beneath the clamp mechanism.

* * * * *